(12) United States Patent
Knaggs

(10) Patent No.: US 6,372,983 B1
(45) Date of Patent: Apr. 16, 2002

(54) ENCLOSURE FOR ELECTRICAL COMPONENTS INSTALLED IN LOCATIONS WHERE A FLAMMABLE GAS OR VAPOR IS EXPECTED TO BE PRESENT

(75) Inventor: L. Brenon Knaggs, Coquitlam (CA)

(73) Assignee: Ballard Generation Systems Inc., Burnaby (CA)

( * ) Notice: Subject to any disclaimer, the term of this patent is extended or adjusted under 35 U.S.C. 154(b) by 0 days.

(21) Appl. No.: 09/291,505

(22) Filed: Apr. 14, 1999

(51) Int. Cl.$^7$ .................................................. H05K 5/02
(52) U.S. Cl. ...................... 174/17 LF; 174/67; 220/242
(58) Field of Search .................. 220/242, 3.8; 174/17 R, 174/176 GF, 67

(56) References Cited

U.S. PATENT DOCUMENTS

| | | | |
|---|---|---|---|
| 3,840,403 A | 10/1974 | George et al. ................. 136/6 |
| 3,857,927 A | 12/1974 | Henrie ........................ 423/580 |
| 3,859,053 A | 1/1975 | Parnes ....................... 23/288 R |
| 3,927,249 A | * 12/1975 | Pearse ......................... 174/51 |
| 4,002,496 A | 1/1977 | Nitta et al. ................... 429/53 |
| 4,008,050 A | 2/1977 | Betz .......................... 23/288 R |
| 4,074,024 A | 2/1978 | Reber .......................... 429/86 |
| 4,078,893 A | 3/1978 | Gilman et al. ................. 23/253 |
| 4,098,964 A | 7/1978 | Reber .......................... 429/86 |
| 4,180,177 A | 12/1979 | Gunderman et al. .......... 220/88 |
| 4,552,821 A | 11/1985 | Gibbard et al. ............... 429/57 |
| 4,562,051 A | 12/1985 | Stoermer, III et al. ....... 423/219 |
| 4,664,281 A | * 5/1987 | Falk et al. .................. 220/308 |
| 4,810,598 A | 3/1989 | Levy et al. ................... 429/59 |
| 4,888,256 A | 12/1989 | Zuckerbrod ................. 429/144 |
| 4,911,879 A | 3/1990 | Heck et al. ................. 376/301 |
| 5,035,875 A | 7/1991 | Daish ........................ 423/580 |
| 5,101,710 A | 4/1992 | Baucom ..................... 454/238 |
| 5,128,219 A | 7/1992 | Kohler et al. ................. 429/59 |
| 5,162,169 A | 11/1992 | Tomantschger et al. ...... 429/59 |
| 5,167,908 A | 12/1992 | Chakraborty ............... 376/301 |
| 5,301,217 A | 4/1994 | Heck et al. ................. 376/301 |
| 5,429,885 A | 7/1995 | Stockburger et al. ......... 429/13 |
| 5,473,646 A | 12/1995 | Heck et al. ................. 376/301 |
| 5,534,664 A | * 7/1996 | Fearing, Jr. et al. .......... 174/50 |
| 5,880,400 A | * 3/1999 | Leischner et al. ............ 174/17 |
| 6,271,463 B1 | * 8/2001 | Kultzow et al. ........ 174/17 FL |

FOREIGN PATENT DOCUMENTS

EP 0 066 676 3/1985

OTHER PUBLICATIONS

Bennett, "The Specification, Testing and Application of Flameproof and Increased Safety Electrical Enclosures for sue in Hazardous Atmospheres," Fourth International Conference on electrical Safety In Hazardous Areas, pp. 116–121 (Nov., 1988).

Martin, "Increased Safety Protection for electrical Enclosures," Process Engineering, p. 37, (Dec., 1983).

* cited by examiner

Primary Examiner—Dean A. Reichard
Assistant Examiner—Adolfo Nino
(74) Attorney, Agent, or Firm—McAndrews, Held & Malloy, Ltd.

(57) ABSTRACT

The present invention provides an electrical component enclosure for installation in a location where a flammable gas or vapor is expected to be present. The electrical component enclosure incorporates a catalyst for inducing a reaction to convert a flammable fluid to a non-flammable product, thereby reducing the flammable fluid concentration and reducing the likelihood of the flammable fluid being ignited. The enclosure preferably permits the free exchange of gas and vapor between the surrounding atmosphere and the enclosure interior.

32 Claims, 3 Drawing Sheets

ENCLOSURE FOR ELECTRICAL COMPONENTS INSTALLED IN LOCATIONS WHERE A FLAMMABLE GAS OR VAPOR IS EXPECTED TO BE PRESENT

FIELD OF THE INVENTION

The present invention provides an enclosure for protecting electrical components installed in a location where a flammable gas or vapor is expected to be present.

BACKGROUND OF THE INVENTION

Enclosures may be used to provide protection for an electrical component such as, for example, an electrical switch, a motor starter, a motor, or an electrochemical fuel cell. These enclosures are typically accessible by opening so that the electrical component placed within the enclosure housing may be accessed and/or serviced. Thus enclosure housings typically comprise at least two pieces that fit together to provide a protective enclosure around the electrical component. In addition to protecting the electrical component against physical damage, in locations where a flammable gas or vapor may be present, it is also desirable for the enclosure to protect the electrical component from exposure to combustible concentrations of the flammable gas or vapor which the electrical components may ignite. So called "restricted breathing" enclosures typically employ gaskets or other sealing mechanisms between separate housing pieces to improve the sealing between the separate pieces. Restricted breathing enclosures are constructed so that the likelihood of a surrounding atmosphere entering the enclosure is reduced to as low a level as possible.

However, gasketed or "sealed" enclosures can not guarantee complete sealing against the penetration of flammable gases by diffusion. This is especially true for gases with a high diffusion rate, such as hydrogen. In addition, it is also believed that even gasketed enclosures "breath" (i.e. fluids pass between the surrounding atmosphere and the enclosure interior). Breathing may be induced by pressure differentials between the enclosure interior and the surrounding atmosphere. Such pressure differentials are affected by temperature changes caused when heat producing components are operated within the enclosure. There may also be other causes for flammable fluid penetration into the interior of an electrical component enclosure, such as, for example, defects in the seal or misalignment of the seals. Furthermore, in addition to flammable fluids which may originate from the atmosphere surrounding the enclosure, flammable fluids may also originate inside the enclosure from electrical components themselves, such as, for example, electrochemical fuel cells.

Therefore, unsealed or even "sealed" openable equipment enclosures, may allow flammable fluids to accumulate therein because of diffusion, breathing, or internal generation of flammable fluids. Thus, when an enclosure is installed in a location where a flammable fluid is expected to be present, it is recognized that there is a potential for a combustible concentration of the flammable fluid to accumulate within the enclosure. Accordingly, for flammable components capable of igniting flammable fluids, electrical codes require particular types of enclosures to be used when such components are installed in a location where a flammable fluid is expected to be present. The nature of the required enclosure depends upon the likelihood and expected frequency of a flammable fluid being present, and other factors such as the likely duration of exposure and the concentration of the flammable fluid. Because these factors may be different at different locations, some electrical codes define different zones which reflect the degree of exposure associated with locations where a flammable fluid is expected to be present.

For example, the Canadian Electrical Code defines such locations as being a Zone 0, Zone 1, or Zone 2 location. A Zone 0 location refers to locations where there is the greatest exposure to a flammable fluid. In a Zone 0 location, a flammable fluid atmosphere is expected to be present either continuously or for long periods. A Zone 1 location refers to the next level of exposure to a flammable fluid. For example, Zone 1 typically refers to locations where exposure to a flammable fluid is not continuous, but a flammable fluid atmosphere is likely to occur either during normal operation, or frequently because of repair or maintenance operations, or because of leakage. Also, a location may be classified as a Zone 1 location if it is adjacent to a Zone 0 location from which flammable fluid atmospheres could be communicated. A Zone 2 location typically refers to a location where there is a possibility of exposure to a flammable fluid, but the likelihood of such an exposure is less than in a Zone 0 or Zone 1 location. For example, exposure to a flammable fluid may occur during system upsets or by being adjacent to a Zone 1 location where a flammable fluid is expected to be present. In Zone 2 locations, exposure to flammable fluid is not likely to occur during normal operation, and if flammable fluid is present, for example, because of a system upset, the flammable fluid is only expected to be present for a short period of time. The aforementioned Canadian Electrical Code generally conforms with international electrical codes such as, for example, International Standard IEC 79-15: 1987.

The Canadian Electrical Code sets out the type of electrical component enclosure that must be used in Zone 0, Zone 1 and Zone 2 locations. For example, the Canadian Electrical Code requires a special flame-proof enclosure for most electrical components installed in Zone 1 or Zone 2 locations. Flame-proof enclosures are also known as explosion-proof enclosures. In Zone 1 and Zone 2 locations, because some exposure to flammable fluids is expected, it is assumed that flammable fluids will eventually accumulate within the flame-proof enclosure. These flame-proof enclosures are made to withstand an internal explosion so that when flammable fluids do accumulate within the enclosure, and are ignited by internal components, the flame-proof enclosure safely contains the explosion. Flame-proof enclosures are designed to contain explosions rather than to prevent them; accordingly, flame-proof enclosures do not depend on keeping flammable fluids outside the enclosure, so these enclosures typically do not employ gasket seals.

However, a problem with flame-proof enclosures is that because they are made to withstand an internal explosion, they are heavy, physically large, and relatively expensive. For example, a model EJB 106 flame-proof enclosure made from cast aluminum by Crouse Hinds, A Division of Cooper Industries, Syracuse, N.Y., weighs about 28 pounds and costs about US $600 compared to a similar sized non-flame-proof enclosure made from plastic or sheet metal that weighs about 5 pounds and costs approximately US $60. Another problem is that, while flame-proof enclosures may contain the explosion, they do not prevent an explosion. Accordingly, the components to be installed in such enclosures are generally made more robust to survive such explosions, adding to the weight, size, and cost of such components.

Accordingly, there is a need for an electrical component enclosure for use in Zone 1 or Zone 2 type locations that is lighter, smaller, and less expensive than a flame-proof enclosure. There is also a need for an electrical component enclosure that may be used in Zone 1 or Zone 2 type locations that prevents flammable fluids from igniting within the enclosure, so that smaller, lighter, and less expensive components may be installed in enclosures located in environments where a flammable fluid is expected to be present.

In Zone 2 type locations, Canadian and international electrical codes require flame-proof enclosures for electrical components which during normal operation generate sparks or have hot surfaces capable of igniting the flammable atmosphere. However, for electrical components that can only ignite the flammable atmosphere during a component failure, gasketed restricted breathing enclosures instead of flame-proof enclosures are permitted. Restricted breathing enclosures are lighter, smaller, and less expensive, compared to flame-proof enclosures. Restricted breathing enclosures may not be permitted where there may be exposure to flammable fluids such as hydrogen or acetylene which have a high diffusion rates. A problem with conventional restricted breathing enclosures is that if a concentration of a flammable fluid does accumulate inside the enclosure, there is no mechanism for reducing the concentration of the accumulated flammable fluid.

Thus electrical codes typically require flame-proof enclosures in Zone 1 type locations, and in zone 2 type locations if the electrical components may generate heat or sparks, or if the flammable fluid which may be present is one with a high diffusion rate. Accordingly, there is a need for an enclosure suitable for use in a zone 1 or 2 type location that is smaller, lighter and less expensive than a flame-proof enclosure.

SUMMARY OF THE INVENTION

An electrical component enclosure for installation in a location where a flammable fluid is expected to be present comprises:
(a) a protective housing for the electrical component, the housing having an opening formed therein which allows fluids to pass between the interior of the housing and a surrounding external atmosphere; and
(b) a catalyst associated with the opening, such that fluids passing through the opening contact the catalyst, whereby the catalyst induces the flammable fluid to react to produce a non-flammable product.

In preferred embodiments, the electrical component is selected from the group consisting of electrical switches, motor starters, motors, electrical panel boards, and electrochemical fuel cells. The enclosure is suitable for installation in a location where a flammable fluid is expected to be present at least intermittently, such as, in particular, a zone 1 or zone 2 type location.

The enclosure preferably further comprises a fluid permeable structure for supporting the catalyst. For example, the fluid permeable structure may comprise a metal mesh that allows gases and water vapor to pass therethrough. Such a metal mesh may be arranged to form a tubular column with an open end associated with the opening. The tubular column may be advantageously vertically oriented so that fluids with different densities will all contact the catalyst at some point along its vertically oriented length.

To prevent particulate contaminants from entering the enclosure, a particulate filter may be associated with the opening. The particulate filter may be a screen or another fluid permeable device that will allow liquids, such as condensed water vapor to drain from the enclosure.

To facilitate gravity draining of liquids from the enclosure, the enclosure is preferably orientable so that a drain opening is located at a low point. The drain opening preferably also serves as a breathing port. The drain/breathing port may be a hole formed in a piece of the housing or an opening formed between two adjoining pieces of the enclosure housing.

The enclosure housing preferably comprises at least two pieces which cooperate to form the housing. Preferably, the housing pieces may be separated so that electrical components contained within the housing may be accessed and/or serviced. To reduce the weight and cost of the enclosure, the protective housing pieces may be made from a thermoplastic material. Alternatively, the protective housing pieces may be made from steel or aluminum or any other suitable housing materials.

An advantage of the present enclosure is that, unlike flame-proof enclosures, the present enclosure need not be constructed to withstand an internal explosion because the catalyst prevents a combustible concentration of flammable fluid from accumulating within the enclosure housing. Thus, the present enclosure may utilize thinner and lighter housing pieces, compared to an equivalent flame-proof enclosure housing made from the same materials.

The aforementioned enclosures permit "breathing". That is, fluids are permitted to pass between the interior of the enclosure and the surrounding atmosphere. Thus sealing mechanisms are not needed between the housing pieces. However, for enclosures that employ a breathing port, it may be desirable to employ a sealing mechanism between the housing pieces so that most of the "breathing" occurs through the breathing port. A sealing mechanism, such as, for example, gaskets may be used to provide sealing between adjoining housing pieces.

The present enclosures are particularly preferred for use in the presence of a flammable fluid comprising hydrogen. In this case the hydrogen is induced by the catalyst to react with oxygen to produce water. The flammable fluid may be pure hydrogen, or a hydrogen-rich fuel such as a reformate stream or natural gas. The catalyst may be any material that is capable of inducing hydrogen to react with oxygen to produce water. A catalyst comprising platinum, for example, is preferred because it is particularly efficient at inducing this reaction under the anticipated conditions within the enclosure. Preferably, the catalyst operates to induce the desired reactions without needing to be heated, and remains active in an environment where water vapor or liquid water may be present near the catalyst.

The catalyst may be mixed with an epoxy binder and applied like paint directly onto the interior surfaces of the enclosure housing, or onto a supporting substrate, such as a fluid permeable mesh. The catalyst may also be disposed on a supporting material, such as, for example, ceramic beads.

In other embodiments, an openable electrical component enclosure comprises:
(a) a housing for surrounding an electrical component capable of generating electrical discharges; and
(b) a catalyst located within the enclosure for inducing the flammable fluid to react to produce a non-flammable product.

In the case where the flammable fluid is hydrogen and the catalyst induces the reaction of hydrogen with oxygen to produce water, the amount of water produced is expected to be very small compared to the amount of water normally present in air. Accordingly, removing the product water from the enclosure is not of critical importance, and in these embodiments, the enclosure does not necessarily require an opening such as a breathing port. Furthermore, the enclosure may employ sealing mechanisms such as gasket seals between adjoining housing pieces of the enclosure.

The present enclosures are particularly suited to deployment in a power generating plant that employs electrochemical fuel cells to generate electricity. The power generating plant comprises an enclosure to protect at least one electrical component installed in a Zone 1 or Zone 2 type location. The enclosure comprises:
(a) a protective housing for the electrical component; the housing having an opening formed therein, which allows fluids to pass between the interior space of the housing and a surrounding external atmosphere; and
(b) a catalyst associated with the opening, such that fluids passing through the opening contact the catalyst, whereby the catalyst induces the flammable fluid to react to produce a non-flammable product.

A method is also provided for making an electrical component enclosure for installation in a location where a flammable fluid is expected to be present. The method comprises applying a catalyst coating to an interior surface of an enclosure housing, wherein the catalyst induces the flammable fluid to react to produce a non-flammable product.

The catalyst coating preferably comprises catalyst and a binder material that can be applied like a paint by brushing or spraying the catalyst coating mixture onto the interior housing surfaces. For catalyst coating mixtures comprising a thermosetting binder, after application onto the housing surface, the catalyst coating may be baked to cure the binder. The housing material may be plastic or metallic, but it may be advantageous to employ a metallic housing material if a high temperature is required to cure the binder.

The disclosed electrical component enclosures are designed to reduce the concentration of a flammable fluid that may accumulate within the enclosure, thereby reducing the likelihood of the flammable fluid being ignited. Accordingly, the present enclosures need not be designed to withstand an internal explosion. Thus an electrical component enclosure is provided that may be made smaller, lighter, and less expensive compared to a conventional flame-proof enclosure that would be acceptable for the same use.

BRIEF DESCRIPTION OF THE DRAWINGS

The advantages, nature and additional features of the invention will become more apparent from the following description, together with the accompanying drawings, in which:

FIGS. 4A and 4B are schematic views of electrical component enclosures comprising a port opening. In FIG. 4A the catalyst is disposed entirely within the enclosure. In FIG. 4B the catalyst is disposed in a compartment that is separated from the portion of the enclosure that houses the electrical component.

DETAILED DESCRIPTION OF PREFERRED EMBODIMENTS

Figure 1:
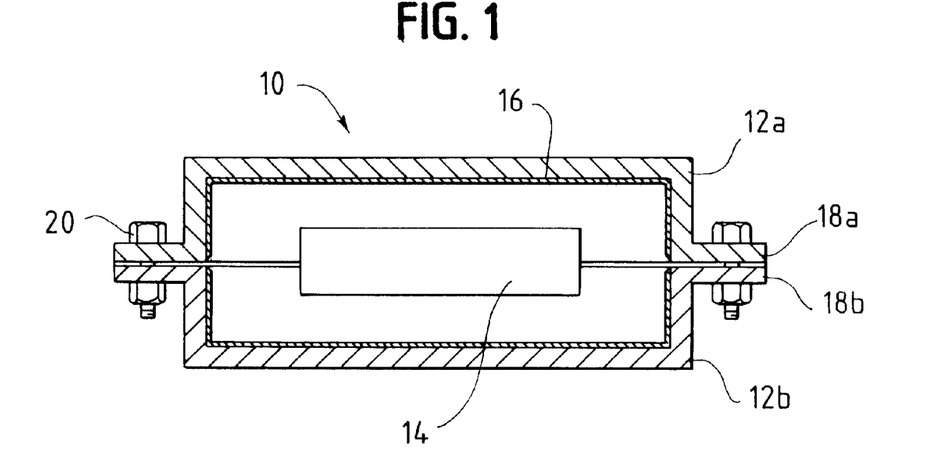
FIG. 1 is a schematic cross sectional view of an embodiment of an electrical component enclosure comprising a catalytic interior surface coating.

FIG. 1 is a schematic cross sectional view of an electrical component enclosure 10. In this preferred embodiment, enclosure 10 comprises a housing 12 having two pieces 12a and 12b. Electrical component 14 may be, for example, a switch, a motor starter, a motor, an electrical panel board, an electrochemical fuel cell, or other electrical component which needs protection.

Coating 16 is disposed on interior surfaces of housing pieces 12a and 12b. Coating 16 comprises a catalyst for inducing a flammable fluid to react to produce a non-flammable product. In a preferred embodiment, for use in the presence of hydrogen and oxygen gas mixtures, the catalyst is a wet-proof platinum catalyst, mixed in a zeolite (clay) and polymeric binder that is applied like a paint, using a sprayer or brush. In this embodiment, hydrogen is induced by the catalyst to react with the oxygen to produce water. Because water is a product of this reaction, water may be present near the catalyst. Accordingly, the preferred catalyst is active in dry or wet conditions. Furthermore, the catalyst is preferably active at ambient temperatures so that it does not need to be heated to induce the desired reactions. The preferred quantity of catalyst is dependent on the enclosure's internal volume and ability to dissipate any heat of reaction.

Enclosure 10 is not fluid-tight and does not employ seals or gaskets between housing pieces 12a and 12b. Thus enclosure 10 is a breathing enclosure which permits some fluids, such as gases and vapors to enter and exit enclosure 10. In the embodiment illustrated in FIG. 1, housing pieces 12a and 12b have flanges 18a and 18b which mate with each other. Removable fasteners such as, for example, the illustrated nuts and bolts 20, or clips or hinges combined with nuts and bolts or latches may be used to fasten housing pieces 12a and 12b together.

Figure 2:
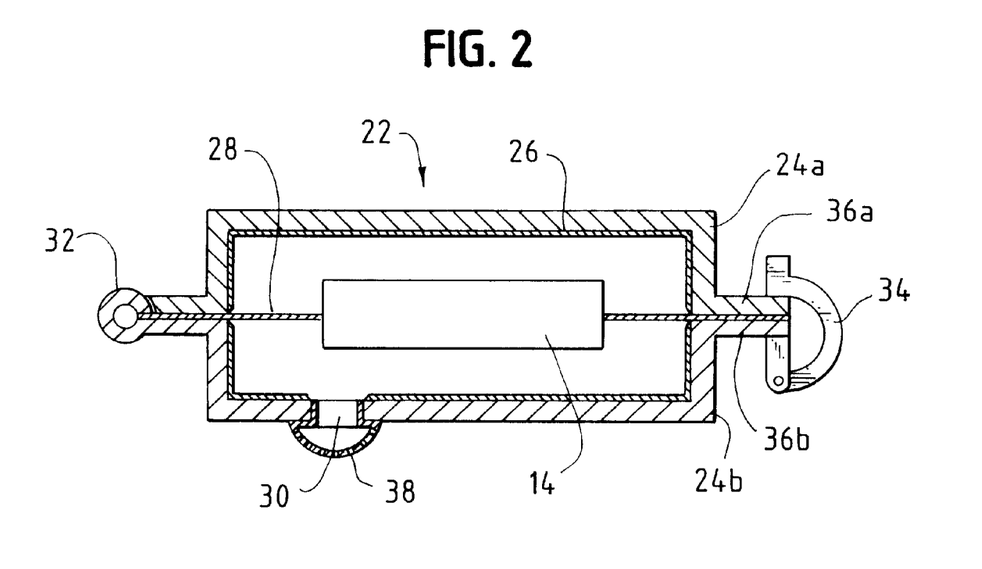
FIG. 2 is a schematic cross sectional view of an embodiment of an electrical component enclosure comprising a catalytic interior surface coating, a gasket seal, and a breathing port.

FIG. 2 is a schematic cross sectional view of a variant of the embodiment of FIG. 1. With reference to FIG. 2, electrical component enclosure 22 comprises housing 24 comprising pieces 24a and 24b which have a catalytic interior surface coating 26. Unlike enclosure 10, enclosure 22 employs a seal 28 and a breathing port 30. Seal 28 may be a gasket or another type of resilient or deformable seal. As an example of another type of fastener, the embodiment illustrated in FIG. 2 employs a hinge 32 and latch 34 mechanism to compress seal 28 between flanges 36a and 36b.

In some applications, it may be desirable to provide a breathing/drain port 30 to control the point of entry/exit of fluids. Breathing port 30 still allows a relatively free exchange of fluids between the interior and exterior of enclosure 22. The catalytically induced reaction may produce additional water vapor, inside the enclosure, however this is expected to be negligible in comparison to the water vapor normally present in the air. The water vapor in the air may exit enclosure 22 through breathing port 30 as water vapor, or the water vapor may condense and exit enclosure 22 as liquid water. In the alternative, with reference to FIG. 1, housing pieces 12a and 12b may be oriented with flanges 18a and 18b in the vertical plane so that water which may condense inside enclosure 10 may drain through the crack between flanges 18a and 18b at the bottom of enclosure 10. In one embodiment, enclosure 10 may have an opening formed between flanges 18a and 18b at the bottom of the enclosure to serve as a breathing opening that also permits draining of condensed water vapor. As shown in FIG. 2, breathing port 30 may be equipped with a dust screen 38 that prevents particulate matter from entering enclosure 22.

In the embodiments illustrated by FIGS. 1 and 2, respective housing pieces 12a and 12b, and 24a and 24b, are preferably made from a metallic material such as, for example, steel or aluminum. The enclosure and catalyst loading will preferably be such that the surface temperatures due to heat of reaction does not exceed 60° C. above ambient when the interior of the enclosure is exposed to a fluid concentration in the flammable range where the heat of reaction is maximized. A housing material with good thermal conductivity is preferred to assist in dissipating the heat generated by the catalytic reaction. However, a more important factor is thermal stability, so plastic or composite materials may also be used, provided they are stable in the aforementioned temperature range.

Figure 3:
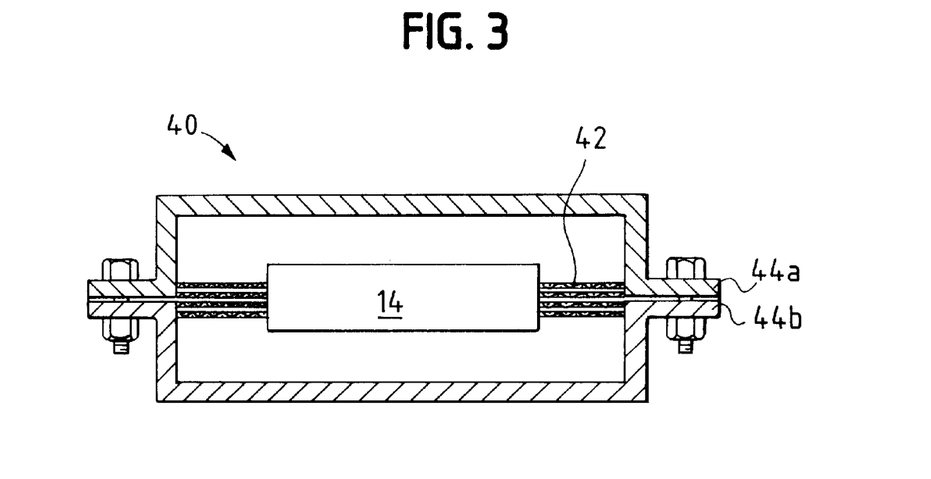
FIG. 3 is a schematic cross sectional view of an electrical component enclosure comprising a catalyst disposed adjacent to the joint between two housing pieces.

FIG. 3 is a schematic cross sectional view of another preferred embodiment of an improved electrical component enclosure 40. In this embodiment, instead of employing a catalytic coating, a catalyst is disposed on a fluid permeable screen 42 disposed adjacent to the joint between flanges 44a and 44b. Screen 42 is preferably made from a metallic material. Breathing between the interior and surrounding atmosphere occurs through cracks between flanges 44a and 44b. Thus flammable fluids that enter enclosure 40 pass through screen 42 and are exposed to the catalyst disposed thereon. This arrangement aims to prevent a combustible concentration of the flammable fluid from accumulating inside enclosure 40.

Figure 4A:
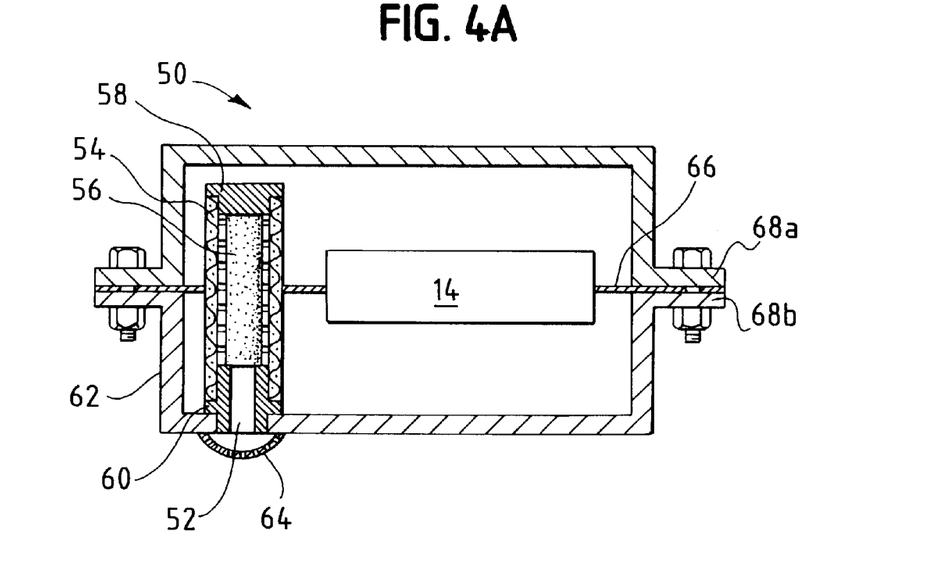
Figure 4B:
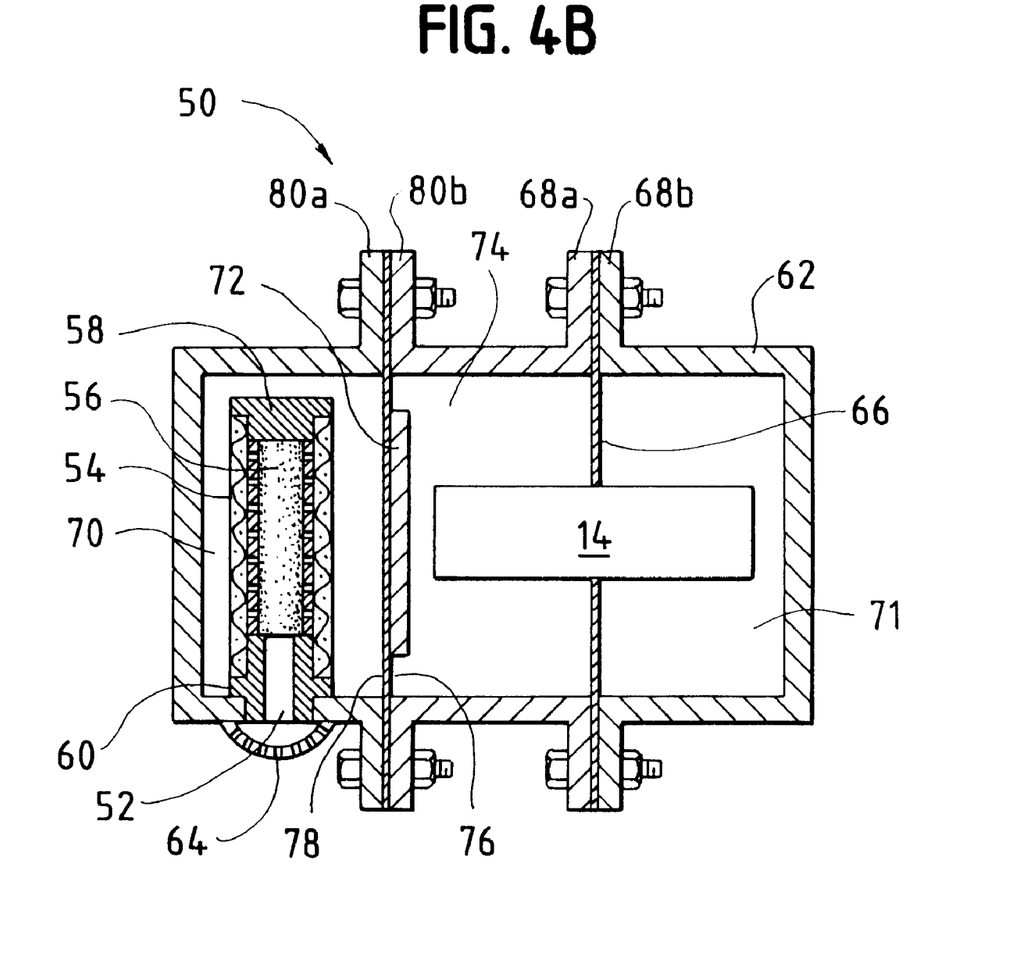

FIGS. 4A and 4B are schematic cross sectional views of variants of another preferred embodiment of an electrical component enclosure 50. In the embodiments illustrated in FIGS. 4A and 4B, a catalyst is associated with a breathing port opening 52. The catalyst is preferable disposed on a fine wire mesh 54 that allows the passage of gases, water vapor, and liquid water. Mesh 54 may be wound around a supporting structure. For example, the supporting structure may comprise a perforated tube 56, an end cap 58 and a cylindrical hollow mounting piece 60 which may be used to attach the supporting structure to enclosure housing 62. Mounting piece 60 preferably comprises a threaded end for co-operating with a tapped breathing port opening. Mesh 54 and its associated catalyst are preferably vertically oriented as shown in FIGS. 4A and 4B. This orientation is preferred in certain situations because some flammable fluids, such as hydrogen, are lighter than oxygen. Thus hydrogen will tend to accumulate near the top of the enclosure and oxygen will be immediately below. The vertical orientation ensures that the hydrogen-oxygen interface will be in contact with the catalyst.

In these embodiments, enclosure housing 62 is not in direct contact with the catalyst so it need not be a good thermal conductor. Accordingly, housing 62 may made from a metal or plastic material. Preferably, housing 62 is made from a molded thermoplastic material.

Breathing port 52 may further be equipped with a dust screen 64 to prevent particulate matter from entering enclosure 50.

Breathing port 52 provides a deliberate path for the surrounding atmosphere to enter enclosure 50. If a flammable fluid enters the enclosure it will be drawn through the center of the support structure and then be exposed to the catalyst before entering the portion of enclosure 50 that houses electrical component 14. Flammable gases, such as hydrogen, will be induced by the catalyst to react with oxygen to form water vapor.

FIG. 4A illustrates a variant of enclosure 50 wherein mesh 54 and its associated catalyst is entirely within enclosure 50. One advantage of this embodiment is that the catalyst and its supporting structure are fully protected by the enclosure.

FIG. 4B illustrates a variant of enclosure 50 wherein mesh 54 and its associated catalyst is in adjoining left (as oriented in FIG. 4B) compartment 70 that is partially separated from component 14 in right (as oriented in FIG. 4B) compartment 71 by enclosure wall 72. An advantage of this variant is that compartment 70 may be opened without opening the whole of enclosure 50. This feature allows compartment 70 to be conveniently opened to inspect and/or replace mesh 54 and its associated catalyst. Another advantage is that, although heat generated by the catalytically induced reaction will be small in comparison to the heat generated by the electrical component, any heat generated at the catalyst is more easily dissipated when the catalyst and support structure are located outside of the portion of enclosure 50 which houses component 14. A pair of openings is preferably provided between compartment 70 and compartment 71 which houses component 14, so that if the reactant fluids have different densities, the lighter reactant may enter compartment 70 through higher opening 74 while the heavier reactant may enter compartment 70 through lower opening 76. Breathing port 52 provides a fluid path from the surrounding atmosphere to the interior of enclosure 50 via compartment 70 and openings 74 and 76.

Enclosure 50 typically employs a seal 66 between flanges 68a and 68b so that breathing will occur through the path of least resistance, namely breathing port 52. A seal 78 may also be employed between flanges 80a and 80b at the joint between the housing for compartment 70 and the housing for compartment 71. However, seals are not essential elements of the present enclosure, because flammable fluids that enter enclosure 50 through cracks between flanges 68a and 68b or 80a and 80b, will still be exposed to the outer surface of mesh 54 and thus react to produce a non-flammable product.

Modes Of Operation

The modes of operation are described with reference to the components of housing 50 (the illustrated embodiment of FIG. 4A). However, all embodiments of the present invention are believed to operate in a similar manner.

Typically, the surrounding atmosphere comprises air which is primarily nitrogen and oxygen. When the concentration of hydrogen in air is neither too lean nor too rich, it is said to be in the flammable range. When a surrounding flammable atmosphere enters enclosure 50, hydrogen drawn through breathing port 52 contacts the catalyst on mesh 54 whereupon the hydrogen is induced to react with the amply available oxygen inside the enclosure. Flammable fluids, for example hydrogen, which do pass through mesh 54 or which diffuse through seal 66 may yet react with oxygen in the presence of the catalyst on the outer surface of mesh 54. In any event, the catalytically induced reaction converts enough of the flammable fluid to on-flammable products so that a combustible concentration f flammable fluid does not accumulate within enclosure 50.

When the surrounding atmospheric pressure drops, enclosure 50 will "breathe out" and nitrogen, oxygen, and water vapor are expelled from enclosure 50 through breathing port 52. The actual quantity of water vapor produced by the induced reaction is expected to be negligible compared to the amount of water vapor normally present in the surrounding atmosphere.

When the surrounding atmosphere has a higher concentration of flammable fluid, such that it is too rich to support combustion, the mode of operation may change. For example, if the flammable fluid is hydrogen and there is not sufficient oxygen in the surrounding atmosphere, a explosion hazard outside enclosure 50 does not exist. As the hydrogen accumulates within the enclosure, however, it would normally cause the atmosphere within the enclosure to pass through the flammable range. The catalyst associated with mesh 54, however, will induce the hydrogen to react with oxygen inside the enclosure, until the oxygen is depleted. At this time, the atmosphere within enclosure 50 will be oxygen-depleted (too lean) and not capable of supporting combustion. Once the atmosphere outside enclosure 50 is oxygen-rich, the mode of operation will change again. That is, oxygen will enter enclosure 50 and combine with hydrogen inside enclosure 50 until the hydrogen is depleted.

Through this process, the atmosphere inside the enclosure will remain non-flammable, regardless of the flammable fluid concentration outside the enclosure.

Enclosure 40 is believed to operate in the same way as enclosure 50. Mesh 42 is positioned to contact fluids which pass between the exterior and interior of enclosure 40.

Enclosures 10 and 22 operate in a similar manner to enclosures 40 and 50. The same breathing cycles are anticipated with the same results. However, because the catalyst is not positioned directly between the breathing opening and the electrical component, some flammable fluids may circulate around the electrical component before coming into contact with the catalyst. Nevertheless, the presence of the catalyst induces the same reactions and still prevents the concentration of the flammable fluid inside the enclosure from reaching a combustible concentration.

For these various modes of operation and during transitions between these modes, the catalyst prevents the mixture of fluids inside enclosure 50 from becoming a combustible mixture. A catalyst must be chosen that is suitable for whatever flammable fluid is expected to be present in the surrounding atmosphere, or flammable fluids that may be generated by the electrical component to be installed inside the enclosure. The catalyst causes the fluids to preferentially react with each other so that they can not be ignited by sparks or heat generated by the electrical component.

The described electrical component enclosures which comprise a catalyst are particularly suited for use with electrical components located in atmospheres where hydrogen gas may be present. Hydrogen has a high diffusion rate which is why flame-proof enclosures, rather than restricted breathing enclosures, are required under most electrical codes even for Zone 2 type locations. The present enclosures may provide an alternative that may be employed in the same locations where conventional flame-proof enclosures are normally required. The present enclosures are expected to be similar in size and weight to conventional non-flame-proof enclosures. Accordingly, the present enclosures are expected to have an advantage over conventional flame-proof enclosures in terms of size, weight, and cost.

While hydrogen has been used in this disclosure as an example of a flammable fluid, those skilled in the art will understand that the present electrical component enclosure may also be beneficially used in locations where other flammable fluids may be present, such as, for example, natural gas or acetylene.

Furthermore, the disclosed electrical component enclosures are particularly well suited for installation in power generating plants which employ fuel cells to generate electricity. This is because hydrogen is often used as a fuel for fuel cells, so locations near power plants employing fuel cells are often classified as Zone 1 or Zone 2 locations.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

What is claimed is:

1. An electrical component enclosure for installation in a location where a flammable fluid is expected to be present, said enclosure comprising:
    (a) a protective housing for an electrical component, said housing having an opening formed therein, said opening allowing fluids to pass between the interior of said housing and a surrounding external atmosphere; and
    (b) a catalyst associated with said opening such that fluids passing through said opening contact said catalyst, whereby said catalyst induces said flammable fluid to react to produce a non-flammable product.

2. The enclosure of claim 1 wherein said electrical component is selected from the group consisting of electrical switches, motor starters, motors, electrical panel boards, and electrochemical fuel cells.

3. The enclosure of claim 1 further comprising a fluid permeable structure for supporting said catalyst.

4. The enclosure of claim 3 wherein said fluid permeable structure comprises a metal mesh that allows gases and water vapor to pass through.

5. The enclosure of claim 4 wherein said metal mesh forms a tubular column with an open end associated with said opening.

6. The enclosure of claim 5 wherein said tubular column is vertically oriented.

7. The enclosure of claim 1 further comprising a particulate filter associated with said opening.

8. The enclosure of claim 7 wherein said opening comprises a breathing port.

9. The enclosure of claim 1 wherein said protective housing comprises at least two pieces which cooperate to form said housing.

10. The enclosure of claim 9 wherein said protective housing pieces comprise a thermoplastic housing material.

11. The enclosure of claim 9 wherein said protective housing pieces comprise steel or aluminum housing materials.

12. The enclosure of claim 9 further comprising a sealing mechanism between said protective housing pieces.

13. The enclosure of claim 12 wherein said sealing mechanism comprises a gasket.

14. The enclosure of claim 9 wherein said opening is provided between adjoining surfaces of said protective housing pieces.

15. The enclosure of claim 1 wherein said opening comprises a breathing port.

16. The enclosure of claim 1 wherein said flammable fluid comprises hydrogen which is induced by said catalyst to react with oxygen to produce water.

17. The enclosure of claim 1 wherein said catalyst comprises plantium.

18. The enclosure of claim 1 wherein said catalyst is mixed with an epoxy binder.

19. The enclosure of claim 18 wherein said catalyst mixture is disposed on an interior surface of said housing.

20. An electrical component enclosure for installation in a location where flammable fluid is expected to be present, said enclosure comprising:
    (a) a housing for surrounding an electrical component capable of generating electrical discharges; and
    (b) a catalyst located within said enclosure for inducing said flammable fluid to react to produce a non-flammable product.

21. The enclosure of claim 20 wherein said electrical component is selected from the group consisting of electrical switches, motor starters, motors, and electrical panel boards.

22. The enclosure of claim 20 wherein said housing comprises at least two pieces which cooperate to form said housing.

23. The enclosure of claim 22 further comprising a sealing mechanism between said housing pieces.

24. The enclosure of claim 23 wherein said sealing mechanism comprises a gasket.

25. The enclosure of claim 20 wherein said catalyst is supported on a fluid permeable material.

26. The enclosure of claim 20 wherein said flammable fluid comprises hydrogen which is induced by said catalyst to react with oxygen to produce water.

27. The enclosure of claim 20, wherein said catalyst comprises platinum and said catalyst induces the desired reaction at an ambient temperature.

28. The enclosure of claim 20 wherein said catalyst is mixed with a supporting material and a binder.

29. The enclosure of claim 28 wherein said supporting material is ceramic beads.

30. The enclosure of claim 28 wherein said binder is an epoxy material.

31. The enclosure of claim 28 wherein said catalyst mixture is disposed on an interior surface of said housing.

32. A power generating plant that employs electrochemical fuel cells to generate electricity, wherein said power generating plant comprises an enclosure to protect an electrical component installed in a Zone 1 or Zone 2 type location, said enclosure comprising:

(a) a protective housing for an electrical component, said housing having an opening formed therein, said opening allowing fluids to pass between the interior of said housing and a surrounding external atmosphere; and (b) a catalyst associated with said opening such that fluids passing through said opening contact said catalyst, whereby said catalyst induces said flammable fluid to react to produce a non-flammable product.

* * * * *

UNITED STATES PATENT AND TRADEMARK OFFICE
CERTIFICATE OF CORRECTION

PATENT NO.      : 6,372,983 B1
DATED           : April 16, 2002
INVENTOR(S)     : L. Brenon Knaggs

It is certified that error appears in the above-identified patent and that said Letters Patent is hereby corrected as shown below:

<u>Column 5,</u>
Line 32, after "enclosures" please delete ".".

<u>Column 8,</u>
Line 49, please change "on-flammable" to -- non-flammable --.
Line 50, please change "f" to -- of --.

Signed and Sealed this

Fourteenth Day of January, 2003

JAMES E. ROGAN
*Director of the United States Patent and Trademark Office*